(12) United States Patent
Cannata (10) Patent No.: US 6,929,103 B2
(45) Date of Patent: Aug. 16, 2005

(54) SELF-ENERGIZING BRAKE SYSTEM

(75) Inventor: Antonio Cannata, London (CA)

(73) Assignee: Tonand Inc., London (CA)

( * ) Notice: Subject to any disclaimer, the term of this patent is extended or adjusted under 35 U.S.C. 154(b) by 58 days.

(21) Appl. No.: 10/734,217

(22) Filed: Dec. 15, 2003

(65) Prior Publication Data

US 2005/0127745 A1 Jun. 16, 2005

(51) Int. Cl.[7] .................................. F16D 57/06
(52) U.S. Cl. ..................... 188/295; 188/294; 303/11
(58) Field of Search ............... 188/290–295, 188/271; 303/10, 11

(56) References Cited

U.S. PATENT DOCUMENTS

| | | | | |
|---|---|---|---|---|
| 1,741,875 A | * | 12/1929 | Paul ........................... | 188/294 |
| 2,880,825 A | | 4/1959 | Porter | |
| 3,638,768 A | | 2/1972 | Ostwald ...................... | 188/294 |
| 3,983,966 A | * | 10/1976 | Bryant ........................ | 188/2 R |
| 4,451,094 A | * | 5/1984 | Martin ......................... | 303/10 |
| 4,530,416 A | | 7/1985 | Kassai ......................... | 180/307 |
| 5,178,238 A | * | 1/1993 | Schaeff ........................ | 188/295 |
| 5,325,944 A | | 7/1994 | Livingston, Sr. ............. | 188/294 |
| 5,465,817 A | * | 11/1995 | Muscatell .................... | 188/295 |
| 6,068,351 A | * | 5/2000 | Martin-Gerez ............... | 303/10 |
| 6,328,388 B1 | * | 12/2001 | Mohr et al. .................... | 303/10 |
| 6,360,854 B1 | | 3/2002 | Hwang ................... | 188/151 R |

* cited by examiner

*Primary Examiner*—Chris Schwartz (57) ABSTRACT

A braking system comprised of a rotor, a plurality of actuators, a brake control unit and a by-pass valve. When in a brake-on mode of operation, the brake control unit effects braking by restricting the flow of a working fluid that is pumped in and out by each of the plurality of actuators as they engage the rotating rotor. The degree of restriction to the flow of the working fluid can be varied to adjust the amount of braking force applied. The brake system is self-energizing in that it is not reliant on a substantial external source to create the operating pressure necessary to effect braking. Operating the by-pass valve into a by-pass on position effectively negates the generation of braking forces normally resulting from operation into the brake-on mode of operation while still allowing the actuators to engage the rotor and working fluid to be circulated.

18 Claims, 6 Drawing Sheets

SELF-ENERGIZING BRAKE SYSTEM

FIELD OF INVENTION

The present invention relates to the field of brake systems. In particular, to brake systems that do not require significant external energization in order to operate.

BACKGROUND

Braking systems such as those used to retard the motion of all manner of wheeled transportation vehicles come in many forms. The brake systems are most typically of a drum or disk configuration with a shoe or pad made of abrasive material acting on the drum or disk, respectively, to produce a friction derived braking force. Application of the shoe or pad is usually accomplished by the application of force, in the form of pressure, to press an abrasive face of the shoe or pad against the drum or disk.

In early brake systems the force pressing on the shoe or pad was applied mechanically using mechanical advantage (leverage) to augment the brake force applied by the vehicle operator at the operator interface (usually a brake pedal). Later systems used a hydraulic circuit to convert operator input to a hydraulic force acting on the braking components. Numerous approaches have been developed to augment the operator input to the brake system in order to provide additional energization (applied force) of the braking components. These approaches include vacuum assist, pump-generated hydraulic assist, electric servo assist, pump-generated air pressure assist and other similar approaches.

Despite the fact that a braking system is an essential and critical component of most transportation vehicles, the braking systems in common use are quite complex, expensive to manufacture, and require regular and costly maintenance due to their complexity and the use of friction as the primary mechanism for generating braking forces.

What is needed is a self energizing braking system that is simple and that has a low maintenance requirement.

SUMMARY OF INVENTION

A braking system according to the present invention comprises a rotor, a plurality of actuators, a brake control unit and a by-pass valve. When in a brake-on mode of operation, the brake control unit effects braking by restricting the flow of a working fluid that is pumped in and out by each of the plurality of actuators as they engage the rotating rotor. The degree of restriction to the flow of the working fluid can be varied to adjust the amount of braking force applied. The brake system is self-energizing in that it is not reliant on a substantial external source to create the operating pressure necessary to effect braking. Operating the by-pass valve into a by-pass on position effectively negates the generation of braking forces normally resulting from operation into the brake-on mode of operation while still allowing the actuators to engage the rotor and working fluid to be circulated.

In accordance with one aspect of the present invention, a brake system for applying a braking force to a vehicle wheel responsive to a brake force control signal comprising: a rotor connected for rotation with the vehicle wheel; a plurality of hydraulic actuators for engaging the rotor to apply the braking force, each hydraulic actuator having a working inlet and a working outlet through which a working fluid can be pumped in and out, respectively, responsive to rotation of the rotor, wherein the working inlets of the plurality of hydraulic actuators are interconnected and the working outlets of the plurality of hydraulic actuators are interconnected; a brake control unit in fluid communication between the working inlets and the working outlets, and operable, responsive to the brake force control signal, between a brake-off position, providing substantially unrestricted fluid communications between the working outlets and the working inlets, and a brake-on position, providing restricted fluid communications in proportion to the brake force control signal; and a by-pass valve in fluid communication between the working outlet and the brake control unit and the working inlets, and operable between a by-pass off position, providing substantially unrestricted fluid communications between the working outlets and the brake control unit, and a by-pass on position, providing substantially unrestricted fluid communications between the working outlets and the working inlets thereby by-passing and negating the effect of the brake control unit.

In accordance with another aspect of the present invention, a brake system comprising: a rotor connected for rotation with a vehicle wheel and a plurality of brake sub-systems each having: a hydraulic actuator engagable with the rotor for applying a brake force having a working inlet and a working outlet through which a working fluid can be pumped in and out, respectively, responsive to rotation of the rotor; a brake control unit in fluid communication between the working inlet and the working outlet, and operable, responsive to a brake force control signal, between a brake-off position, providing substantially unrestricted fluid communications between the working outlet and the working inlet, and a brake-on position, providing restricted fluid communications in proportion to the brake force control signal; and a by-pass valve in fluid communication between the working outlet and the brake control unit and the working inlet, and operable between a by-pass off position, providing substantially unrestricted fluid communications between the working outlet and the brake control unit, and a by-pass on position, providing substantially unrestricted fluid communications between the working outlet and the working inlet thereby by-passing and negating the effect of the brake control unit; wherein the working inlets of the plurality of brake sub-systems are interconnected and the working outlets of the plurality of brake sub-systems are interconnected.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 1:
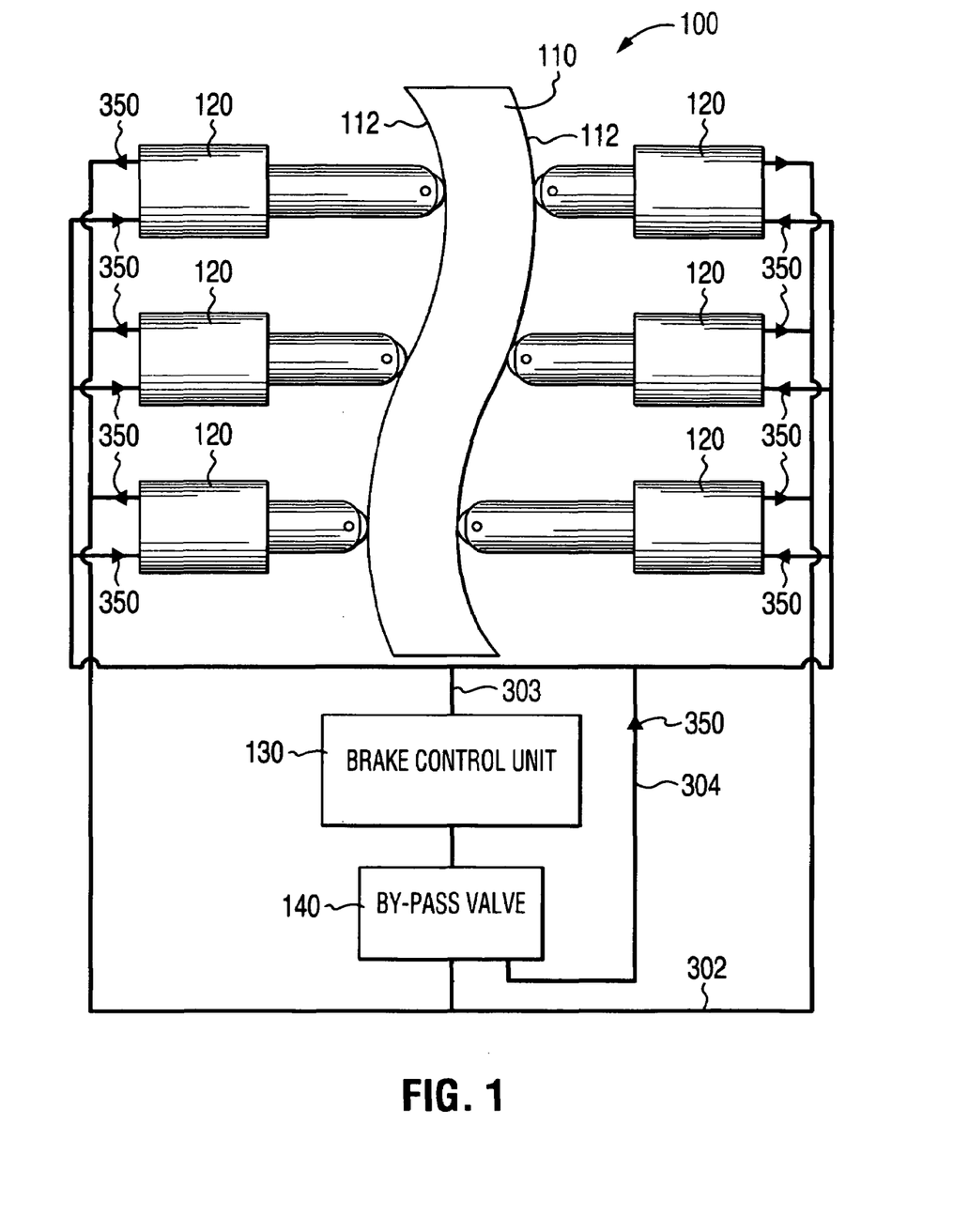
FIG. 1 is a schematic representation of an exemplary embodiment of a braking system according to the present invention.

FIG. 1 is a schematic representation of an exemplary embodiment of a braking system 100 according to the present invention for use in, for example, a wheeled vehicle. The braking system 100 is comprised of an interface mechanism in the form of a rotor 110, a plurality of actuators 120, a brake control unit 130 and a by-pass valve 140. The rotor 110 can be connected to a vehicle wheel (not shown) so as to rotate when the wheel rotates. The braking system 100 has a brake-on and a brake-off mode of operation.

In the brake-on mode of operation, each of the plurality of actuators 120 engages the rotor 110 to impart a braking (decelerative) force to the rotor 110 and thereby to the wheel. In the brake-off mode of operation, none of the plurality of actuators 120 applies any substantial braking force to the rotor 110. The brake control unit 130 is operable between a brake-on position and a brake-off position that effect the brake-on and the brake-off modes of operation respectively. The brake control unit 130 is operated between the brake-on and the brake-off positions by a brake force control signal (not shown) received at the brake control unit 130. When in the brake-on position, the brake control unit 130 effects braking by restricting the flow of a working fluid such as, for example, brake fluid or a similar non-compressible fluid that is pumped in and out by each of the plurality of actuators 120 as they engage the rotating rotor 110. The degree of restriction to the flow of the working fluid can be varied to adjust the amount of braking force applied by the plurality of actuators 120 to the rotor 110. The brake system 100 is self-energizing in that it is not reliant on a substantial external source to create the operating pressure necessary to effect braking. Restriction of the working fluid flow is described in more detail below.

The braking force applied to the rotor 110 when the brake control unit 130 is in the brake-on position is proportional to the brake force control signal received at the brake control unit 130. The brake force control signal is, preferably, proportionate to a desired braking input provided by a vehicle operator at an operator interface such as, for example, a brake pedal (not shown). The brake force control signal can take the form of an electrical signal, a hydraulic pressure signal, a pneumatic signal or other similar signaling mechanism that provides for the propagation of a proportionate control signal. Correspondingly, the brake control unit 130 can be operated from the brake-off to the brake-on positions and vise versa by an electrical solenoid, a hydraulic actuator, a pneumatic actuator or other similar mechanism (not illustrated). In the case of a hydraulic pressure signal, the pressure required for the hydraulic pressure signal can be substantially less than the operating pressure of the working fluid in the brake system 100.

Figure 4A:
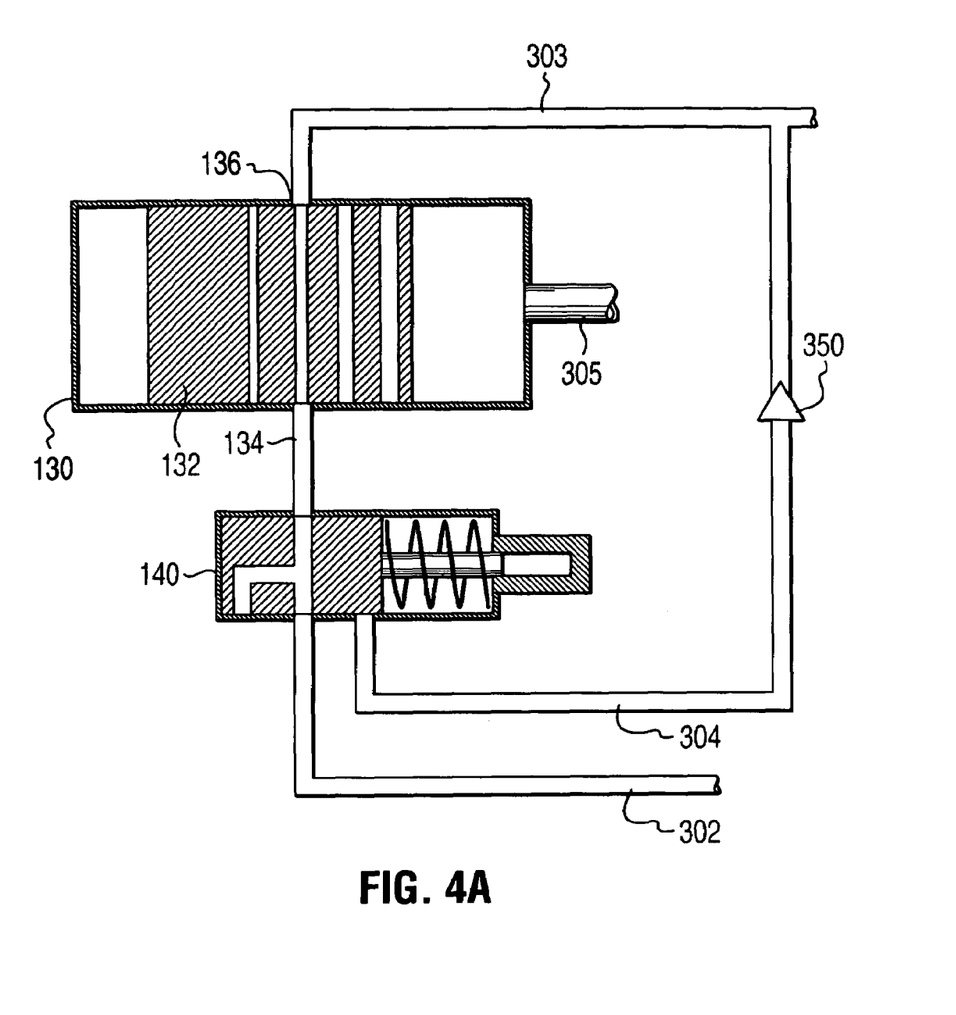
FIGS. 4A and B are schematic representations of a brake control unit and a by-pass valve according to an exemplary embodiment of the present invention showing the by-pass valve in a by-pass off an a by-pass on positions, respectively.
Figure 4B:
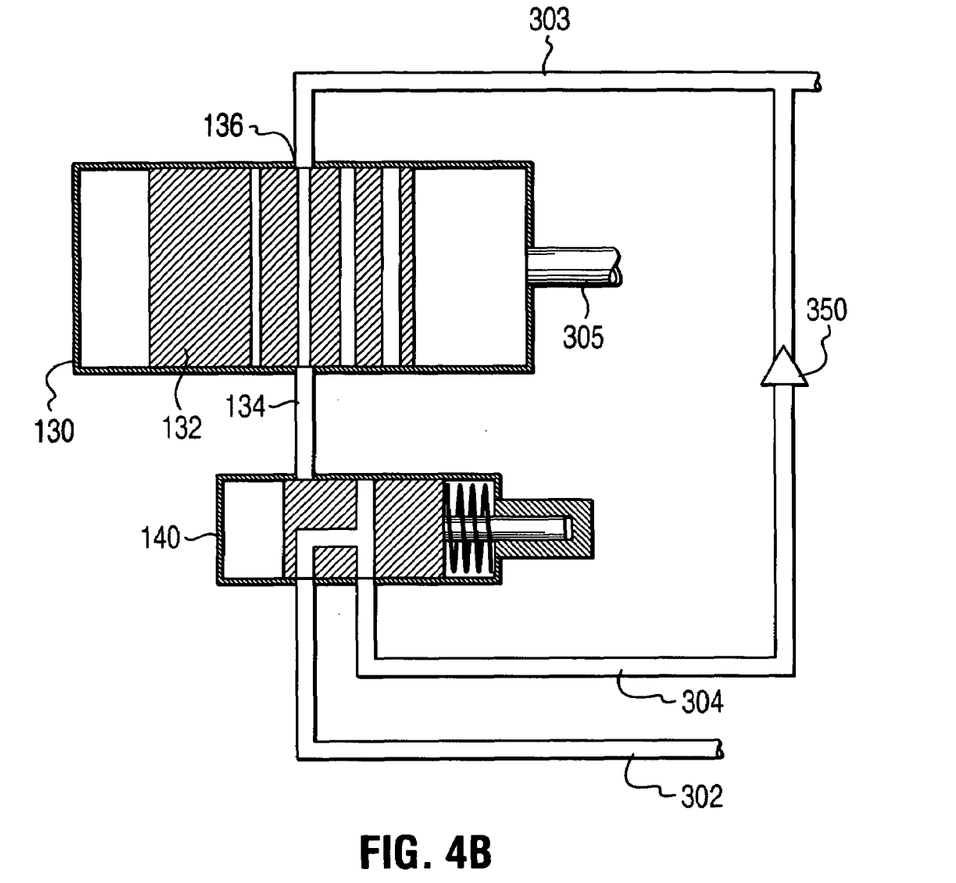

FIGS. 4A and B are schematic representations of a brake control unit 130 and a by-pass valve 140 according to an exemplary embodiment of the present invention showing the by-pass valve 140 in a by-pass off and a by-pass on positions, respectively. The by-pass valve 140 is operable between the by-pass on position and the by-pass off position. The by-pass off position is normally selected in the brake-on mode of operation. The by-pass off position is also normally selected in the brake-off operating modes. When the brake control unit 130 is in the brake-on position and the by-pass valve 140 is in the by-pass on position, the actuators 120 engage the rotor 110 but do not apply any substantial braking force. Operating the by-pass valve 140 into the by-pass on position effectively negates the generation of braking forces normally resulting from the operation of the brake control unit 130 into the brake-on position while still allowing the actuators 120 to engage the rotor 110 and working fluid to be circulated (i.e. pumped in and out). This mode of operation can be used, for example, to permit the working fluid to attain or to maintain a desired operating temperature without necessitating the application of braking forces to do so.

The rotor 110 is, for example, substantially disc-shaped with a cam surface 112 on each of two faces. Preferably the two cam surfaces 112 have corresponding cam profiles in terms of a number of undulations on each surface and an amplitude of the undulations.

Preferably the two faces having cam surfaces 112 are opposed. When installed on a vehicle, the rotor 110 is so arranged that it is rotatably connected to a wheel (not illustrated) of the vehicle. Rotation of the wheel causes the rotor 110 to rotate and braking force applied to the rotor 110 causes braking (deceleration) of the wheel. Note that the rotor 110 can be used to prevent acceleration of the wheel such as, for example, to hold the vehicle stationary.

Figure 2:
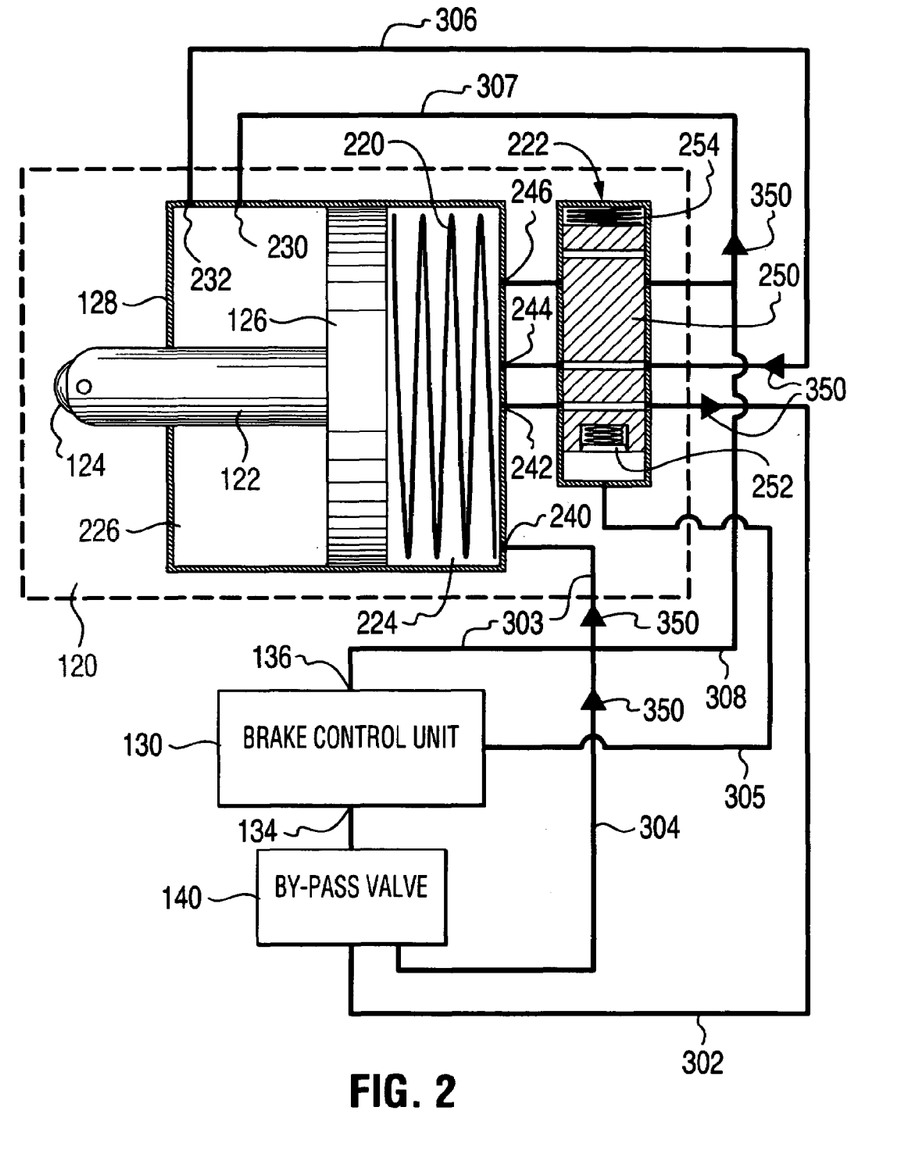
FIG. 2 is a schematic representation of an actuator, the brake control unit and the by-pass valve according to an exemplary embodiment of the present invention in the brake-on mode of operation.
Figure 3:
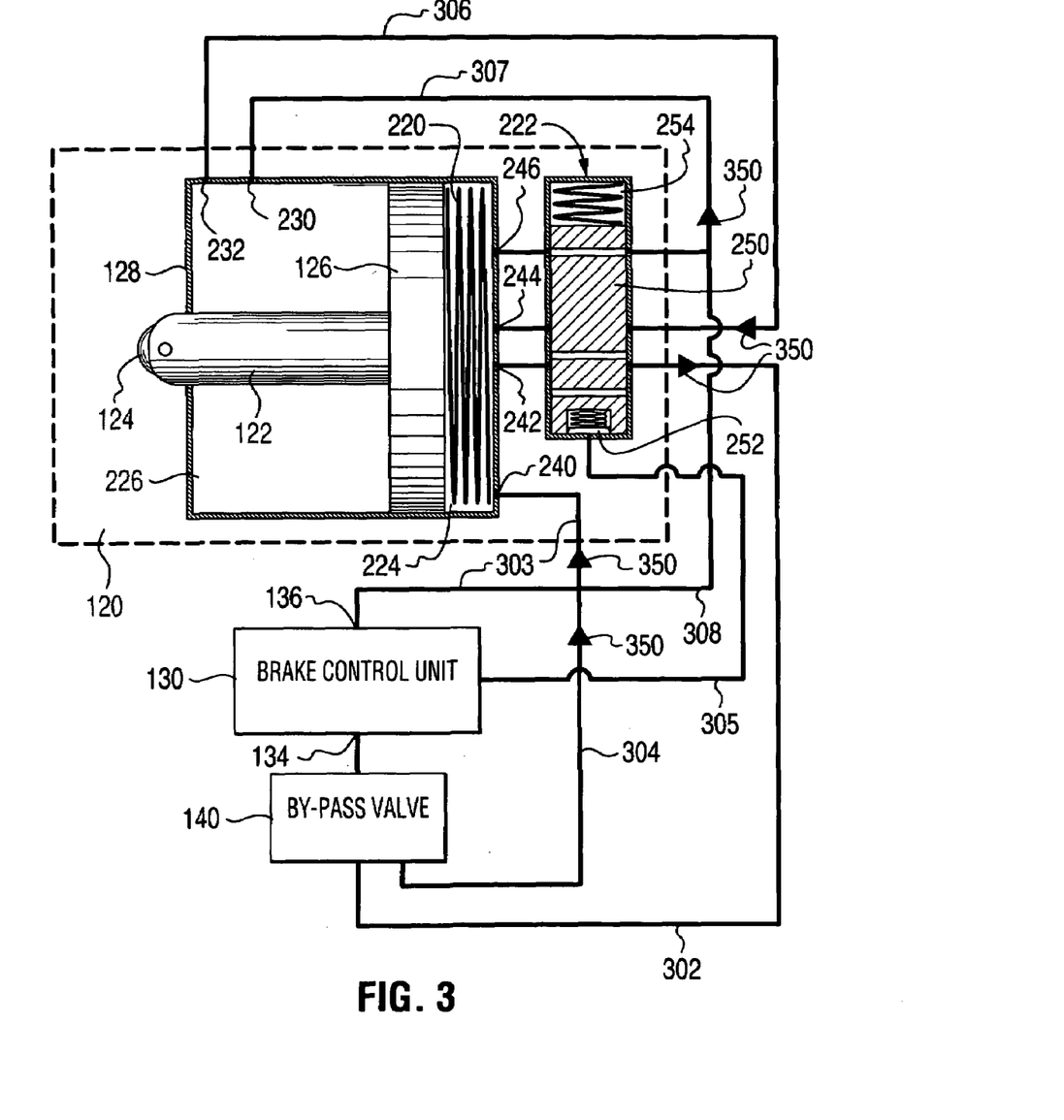
FIG. 3 is a schematic representation of an actuator, the brake control unit and the by-pass valve according to an exemplary embodiment of the present invention in the brake-off mode of operation.

The plurality of actuators 120 engages the rotor 110 in order to generate braking forces. The plurality of actuators 120 is preferably arranged such that an equal number of actuators 120 engage each of the cam surfaces 112. Referring now to FIGS. 2 and 3 that are schematic representations of an actuator 120, the brake control unit 130 and the by-pass valve 140 according to an exemplary embodiment of the present invention. Each actuator 120 is comprised of a plunger 122 and a hydraulic cylinder 128. The hydraulic cylinder 128 contains a piston 126 which can be made to reciprocate in the hydraulic cylinder 128. The plunger 122 is connected to the piston 126 and moves in and out of the actuator 120, through an aperture at one end of the hydraulic cylinder 128, in conjunction with movement of the piston 126. A rolling interface 124 is disposed at one end of the plunger 122. The rolling interface 124 can engage (i.e. come in contact with) the rotor 110. The rolling interface 124 preferably generates little or no frictional resistance to rotational motion of the rotor 110 relative to the actuator 120. The rolling interface 124 can, for example, be comprised of a ball bearing, a roller bearing or other similar low-friction bearing mechanisms including sliding mechanisms.

The actuator 120 further comprises a resilient element 220, a flow direction valve 222, a working cavity 224 and an opposing cavity 226. The piston 126 divides the internal volume into the opposing cavity 226 at the plunger 122 aperture end of hydraulic cylinder 128 and the working cavity 224 at the other end of the hydraulic cylinder 128. The resilient element 220 biases the piston 126, and therefore also the plunger 122, towards the plunger 122 aperture end of the hydraulic cylinder 128. In operation the working cavity 224 and the opposing cavity 226 are normally filled with the working fluid. As the piston 126 moves back and forth in the hydraulic cylinder 128, the volume of the opposing cavity 226 expands while the volume of the working cavity 224 contracts in response to movement in one direction and vise versa in the other direction. The working cavity 224 is comprised of a working inlet port 240, a working outlet port 242, a balancing inlet port 244 and a balancing outlet port 246. The flow direction valve 222 is in fluid communications with each of the working outlet port 242, the balancing inlet port 224 and the balancing outlet port 242.

The brake control unit 130 is comprised of a brake control valve 132, a control inlet port 134 and a control outlet port 136. The control outlet port 136 is in fluid communications with the working inlet port 240 via hydraulic pressure line 303. The control inlet port 134 is in fluid communications with working outlet port 242 via hydraulic pressure line 302. Hydraulic pressure line 303 incorporates a one-way flow control valve 350 that permits working fluid flow only from the brake control unit 130 to the working cavity 224. Hydraulic pressure line 302 incorporates a one-way flow control valve 350 that permits working fluid flow only from the working cavity 224 to the brake control unit 130.

Referring to FIG. 2, when the braking system 100 is in the brake-on mode of operation, the actuator 120 is engaged with the rotor 110. The plunger 122 moves back and forth (i.e. reciprocates) in response to the undulations on the cam surface 112 of the rotating rotor 110 and the biasing effect of the resilient element 220. The back and forth movement of the plunger 122 results in similar movement of the piston 126 and therefore expansion and contraction of the volume of the working cavity 224. When the volume of the working cavity 224 expands work fluid enters the working cavity 224 from hydraulic pressure line 303. When the volume of the working cavity 224 contracts work fluid is expelled from the working cavity 224 into hydraulic pressure line 302.

Each of the plurality of actuators 120 is in fluid communications with the brake control unit 130 via a hydraulic pressure line 303 and a hydraulic pressure line 302 as described above. All of the hydraulic pressure lines 303 are interconnected and connected to control outlet port 136. All of the hydraulic pressure lines 302 are interconnected and connected to control inlet port 134.

The plurality of actuators 120 is arranged so that, preferably, an equal number of actuators engage each of the two cam surface 112 of the rotor 110. The actuators 120 are held in an operable arrangement by a caliper or other similar mechanism (not illustrated). The actuators 120 arranged to engage one of the cam surfaces 112 are, preferably, further arranged to engage different points along the cam profile (undulations) such that one actuator 120 is engaged with a rising portion of the cam surface 112 while another actuator 120 is engaged with a falling portion of the cam surface 112. At any point in the rotation of the rotor 110 one or more of the actuators 120 have their plungers extending out to the rotor 110 while one or more other actuators 120 have their plungers being retracted in by the rotor 110. The above description applies equally to the actuators 120 arranged to engage the other of the cam surfaces 112.

As the rotor 110 rotates with the braking system 100 in the brake-on mode of operation there are, preferably, an equal number of actuators 120 with their plungers extending as there are actuators 120 with their plungers retracting at any given moment in time. Each actuator 120 alternates between extension of and retraction of its plunger as the actuator 120 engages with different portions of the cam surface 112 of the rotating rotor 110. As a result the piston 126 in each actuator is reciprocating and the volume of the working cavity 224 is alternately expanding and contracting.

When the volume of the working cavity 224 in an actuator 120 contracts working fluid is expelled through the working outlet port 242 and into hydraulic pressure line 302. When the volume of the working cavity 224 in an actuator 120 expands working fluid is admitted into the working cavity 224 from hydraulic pressure line 303. The actuator 120 effectively pumps working fluid in from hydraulic pressure line 303 and out to hydraulic pressure line 302. The one-way flow control valves 350 incorporated in the hydraulic pressure lines 302, 303 prevent the working fluid from being pumped in the reverse direction through the hydraulic pressure lines.

The plurality of actuators 120 is arranged such that at any instant in time when the rotor 110 is rotating and the braking system 100 is in the brake-on mode that one or more actuators 120 are pumping out working fluid that is presented at the control inlet port 134 of the brake control unit 130 via the hydraulic pressure lines 302 and one or more actuators 120 are pumping in working fluid, via the hydraulic pressure lines 303, which is drawn from the control outlet port 136 of the brake control unit 130.

Referring to FIG. 3, when brake control unit 130 is in the brake-off position, control inlet port 134 is in substantially unrestricted fluid communications with control outlet port 136 allowing substantially unrestricted flow of the working fluid from hydraulic pressure line 302 to hydraulic pressure line 303. Referring to FIG. 2, with the brake control unit 130 in the brake-on position, flow from the control inlet port 134 to the control outlet port 136 can be restricted, down to fully restricted, in proportion to the brake force control signal. Restriction of the working fluid flow from the control inlet port 134 to the control outlet port 136 is provided by the brake control valve 132 which can be, for example, a spool valve or other similar proportionate flow-restricting mechanism.

As the actuators 120 extend and retract in response to the rotation of the rotor 110 each in turn alternately pumps working fluid out into a corresponding hydraulic pressure line 302 and pumps working fluid in from a corresponding hydraulic pressure line 303. The interconnection of the hydraulic pressure lines 302 and the hydraulic pressure lines 303 via the brake control unit 130 permits the circulation and exchange of working fluids amongst the plurality of actuators 120. Restriction of the working fluid flow from the control inlet port 134 to the control outlet port 136 when the brake control unit 130 is in the brake-on position results in restricted flow of working fluid from hydraulic pressure lines 302 to hydraulic pressure lines 303. In turn the extension and the retraction of the actuators 120 is resisted by the restricted working fluid flow into and out of each actuator 120 thereby applying a braking force to the rotor 110.

Referring now to FIGS. 2 and 4A, B. The by-pass valve 140 is hydraulically in-line between the hydraulic pressure lines 302 and the control inlet port 134 of the brake control unit 130. When the by-pass valve 140 is in the by-pass off position, the hydraulic pressure lines 302 are in substantially unrestricted fluid communications with the control inlet port 134. When the by-pass valve 140 is in the by-pass on position, the hydraulic pressure lines 302 are diverted from fluid communications with the control inlet port 134 to substantially unrestricted fluid communications with hydraulic pressure line 304 thereby effectively by-passing the brake control unit 130 and negating any work fluid flow restriction provided by the brake control valve 132. Hydraulic pressure line 304 is connected to hydraulic pressure lines 303 via a one-way flow control valve 350 thereby enabling fluid exchange from hydraulic pressure lines 302 to hydraulic pressure lines 303 when the by-pass valve is in the by-pass on position.

Referring to FIGS. 2 and 3, when the piston 126 is displaced toward the plunger 122 aperture end of the hydraulic cylinder 128, working fluid is displaced from the opposing cavity 226 through the opposing outlet port 232 and into hydraulic pressure line 306. Hydraulic pressure line 306 is connected to the flow direction valve 222 and thus the opposing cavity 226 is in fluid communications with the flow direction valve 222. The flow direction valve 222 has a flow direction plunger 250 that is operable between an actuator-engaged position and an actuator-retracted position. In the actuator-engaged position (see FIG. 2), the flow direction plunger 250 provides fluid communications between the hydraulic pressure line 306 and the balancing inlet port 244, thus allowing working fluid flowing through hydraulic pressure line 306, from the opposing cavity 226 to enter the working cavity 224. Hydraulic pressure line 306 incorporates a one-way flow control valve 350 which permits working fluid flow only from opposing outlet port 232 to balancing inlet port 244. In the actuator-engaged position, the flow direction plunger 250 also provides fluid communications between the working outlet port 242 and hydraulic pressure line 302. As the actuator 120 is engaged with the rotor 110, the plunger 122 alternately extends and retracts. When the plunger 122 extends, the piston 126 causes working fluid to be expelled through working outlet port 232 into hydraulic pressure line 306 where it goes on to enter the working cavity 224 via balancing inlet port 244. When the plunger 122 retracts, the piston 126 draws working fluid into the opposing cavity 226 from hydraulic pressure line 307 via opposing inlet port 230. Working fluid is supplied to hydraulic pressure line 307 by hydraulic pressure line 308 that in turn is supplied by hydraulic pressure line 303.

FIG. 3 is a schematic representation of an exemplary embodiment of the present invention with the brake in the brake-off mode of operation. In the brake-off mode of operation the brake control unit 130 is in the brake-off position, the by-pass valve 140 is in by-pass off position and the flow direction valve is in the actuator-retracted position. In the actuator-retracted position, the flow direction plunger 250 provides fluid communications between the balancing outlet port 246 and the hydraulic pressure line 307, thus allowing working fluid to be expelled from the working cavity 224 into hydraulic pressure line 307 and onto the opposing cavity 226. Hydraulic pressure line 307 is equipped with a one-way flow control valve 350. When a transition is made from the brake-on mode of operation to the brake-off mode of operation, the actuator 120 will initially be engaged with the rotor 110. As the rotor 110 rotates the plunger 122 will at one point be driven to retract. When plunger 122 is retracted, the piston 126 will cause working fluid to be expelled from the working cavity 224 via balancing outlet port 246 into hydraulic pressure line 307 and onto the opposing cavity 226 via the opposing inlet port 230. As hydraulic pressure lines 303 and 306 are blocked by the brake control unit 130 and the flow direction valve 222 respectively, there is no available source of working fluid to reenter the working cavity 224. Therefore, even though the resilient element 220 is applying an extending bias, the plunger 122 remains retracted and effectively disengaged from the rotor 110. Parasitic braking when the brake system 100 is in the brake-off mode of operations is thereby reduced.

The flow direction valve 222 can be operated between the actuator-engaged and the actuator-retracted positions by, for example, a hydraulic interconnection with the brake control unit 130. When the brake control valve 130 moves into the brake-on position, working fluid is expelled into hydraulic pressure line 305. The working fluid enters the flow direction valve 222 and displaces the flow-direction plunger 250 into the actuator-engaged position. As the brake control valve 130 provides proportioned operation, the flow direction valve 222 is arranged so that the flow direction plunger 250 moves completely into the actuator-engaged position on the initial movement of the brake control valve 130. Working fluid expelled as a result of further movement of the brake control valve 130 is accommodated by, for example, a hydraulic accumulator 252 incorporated into the flow direction valve 222. When the brake control valve 130 moves into the brake-off position, working fluid is drawn from the hydraulic pressure line 305. The working fluid is drawn from the flow direction valve 222 allowing the flow-direction plunger 250 to move into the actuator-retracted position. In order to ensure rapid transition of the flow direction plunger 250 from the actuator-engaged to the actuator-retracted position, the flow direction valve 222 comprises a resilient element 254 or other similar mechanism to bias the flow direction plunger into the actuator-retracted postion.

On transition from the brake-off mode of operation to the brake-on mode of operation, working fluid can enter the working cavity 224 via working inlet port 240 and balancing inlet port 244 and therefore the plunger 122 can re-engage the rotor 110.

Figure 5:
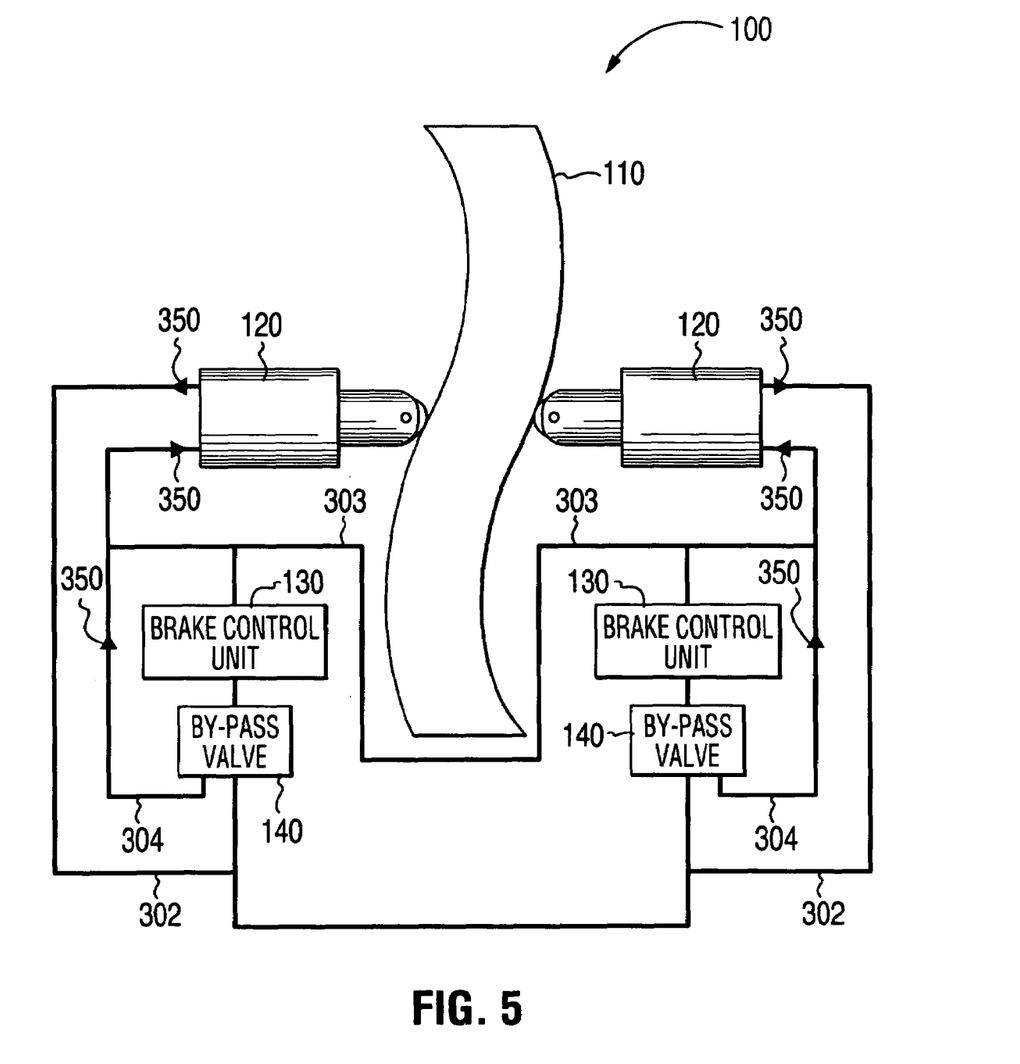
FIG. 5 is a schematic representation of an exemplary embodiment of a braking system according to the present invention wherein each of a plurality of actuators has an associated brake control unit and a by-pass valve.

In the exemplary embodiments described above, the brake system 100 comprises a single brake control unit 130 and a single by-pass valve 140. The hydraulic pressure lines 302 of each of the plurality of actuators 120 are interconnected as are the hydraulic pressure lines 303. In an alternative exemplary embodiment of a brake system according to the present invention represented in FIG. 5, the brake system 100 comprises a plurality of brake sub-systems each comprising an actuator 120, a brake control unit 130 and a by-pass valve 140. The hydraulic pressure lines 303 of the plurality brake sub-systems are interconnected. The hydraulic pressure lines 302 of the plurality brake sub-systems are interconnected.

Hydraulic pressure lines in all of the above descriptions can take the form of, for example, rigid pressure tubing, flexible pressure hose, pressure passageways integrated into other components of the brake system 100, combinations of thereof and other similar mechanisms for channeling a working fluid under pressure.

A brake system 100 according to the present invention can be used as a service brake, a parking brake or a combination thereof while remaining within the spirit and scope of the present invention.

A brake system 100 according to the present invention is compatible with anti-lock braking systems (ABS). An ABS intervention can be applied by modulating the brake force control signal or by modulating operation of the by-pass valve 140 between the bypass-off and the bypass-on positions.

In an alternative embodiment of the brake system 100 according to the present invention, a plurality of actuators 120 can engage a rotor 110 having one or more cam surfaces that are disposed circumferentially on the rotor 110.

A brake system 100 according to the present invention can be used on each wheel or axle of a vehicle. Preferably, the brake system 100 of each wheel or axle can operate independently of any brake system 100 at another wheel or axle thereby providing for robustness against individual brake system 100 failure.

It will be apparent to one skilled in the art that numerous modifications and departures from the specific embodiments described herein may be made without departing from the spirit and scope of the present invention.

What is claimed is:

1. A brake system for applying a braking force to a vehicle wheel responsive to a brake force control signal comprising:
   a rotor connected for rotation with the vehicle wheel;
   a plurality of hydraulic actuators for engaging the rotor to apply the braking force, each hydraulic actuator having:
      a working inlet and a working outlet through which a working fluid can be pumped in and out, respectively, responsive to rotation of the rotor;
      wherein the working inlets of the plurality of hydraulic actuators are interconnected and the working outlets of the plurality of hydraulic actuators are interconnected;
   a brake control unit in fluid communication with the working inlets and the working outlets, and operable responsive to the brake force control signal in a brake-off position and a brake-on position, the brake-off position providing substantially unrestricted fluid communications between the working outlets and the working inlets and the brake-on position providing restricted fluid communications between the working outlets and the working inlets in proportion to the brake force control signal; and
   a by-pass valve in fluid communication with the working outlets, the brake control unit and the working inlets, and operable in a by-pass off position and a by-pass on position, the by-pass off position providing substantially unrestricted fluid communications between the working outlets and the brake control unit and the by-pass on position providing substantially unrestricted fluid communications between the working outlets and the working inlets thereby by-passing and negating the effect of the brake control unit.

2. The brake system of claim 1, the rotor further comprising:
   a substantially disc-shaped main body having two opposed faces; and
   a cam surface on each of the two opposing faces;
   wherein each of the plurality of hydraulic actuators engagable with one of the cam surfaces.

3. The brake system of claim 2, wherein each of the plurality of hydraulic actuators further comprises a rolling interface for engaging one of the cam surfaces with substantially no frictional resistance to rotation of the rotor relative to the actuator.

4. The brake system of claim 3, each of the plurality of hydraulic actuators further comprising:
   a hydraulic cylinder;
   a piston for reciprocating movement in the hydraulic cylinder and separating the hydraulic cylinder into a working cavity and an opposing cavity that expand and contract in volume responsive to the back and forth movement of the piston;
   a plunger, connected to the piston, retracting into and extending from the hydraulic cylinder responsive to the reciprocating movement of the piston; and
   a resilient element biasing the plunger to extend from the hydraulic cylinder;
   wherein the rolling interface is disposed at an end of the plunger extending from the hydraulic cylinder.

5. The brake system of claim 4, each of the plurality of hydraulic actuators further comprising a flow direction valve, operable between an actuator-engaged position and an actuator-retracted position, controlling fluid communication between the working cavity and the opposing cavity and between the working cavity and the brake control unit;
   wherein the hydraulic actuator is free to engage the rotor when the flow direction valve is in the actuator-engaged position and the hydraulic actuator is retained from engagement when the rotor with the flow direction valve is in the actuator-retracted position.

6. The brake system of claim 5, wherein the flow direction valve is operated into the actuator-engaged position and the actuator-retracted position responsive to the brake control unit being operated into the brake-on position and the brake-off position respectively.

7. The brake system of claim 2, wherein each of the plurality of hydraulic actuators for engaging one of the cam surfaces engages a different portion of a profile of the cam surface.

8. The brake system of claim 2, wherein an equal number of the plurality of hydraulic actuators can engage each of a first and a second of the cam surfaces.

9. The brake system of claim 1, wherein the brake force control signal is selected from the group consisting of an electric signal, a hydraulic pressure signal and a pneumatic signal.

10. A brake system comprising:
    a rotor connected for rotation with a vehicle wheel; and
    a plurality of brake sub-systems each having:
       a hydraulic actuator engagable with the rotor for applying a brake force having:
          a working inlet and a working outlet through which a working fluid can be pumped in and out, respectively, responsive to rotation of the rotor;
       a brake control unit in fluid communication with the working inlet and the working outlet, and operable responsive to the brake force control signal in a brake-off position and a brake-on position, the brake-off position providing substantially unrestricted fluid communications between the working outlet and the working inlet and the brake-on position providing restricted fluid communications between the working outlet and the working inlet in proportion to the brake force control signal; and
       a by-pass valve in fluid communication with the working outlet, the brake control unit and the working inlet, and operable in a by-pass off position and a by-pass on position, the by-pass off position providing substantially unrestricted fluid communications between the working outlet and the brake control unit and the by-pass on position providing substantially unrestricted fluid communications between the working outlet and the working inlet thereby by-passing and negating the effect of the brake control unit;
    wherein the working inlets of the plurality of brake sub-systems are interconnected and the working outlets of the plurality of brake sub-systems are interconnected.

11. The brake system of claim 10, the rotor further comprising:
    a substantially disc-shaped main body having two opposed faces; and
    a cam surface on each of the two opposing faces;
    wherein each of the hydraulic actuators engagable with one of the cam surfaces.

12. The brake system of claim 11, wherein each of the hydraulic actuators further comprises a rolling interface for engaging one of the cam surfaces with substantially no frictional resistance to rotation of the rotor relative to the actuator.

13. The brake system of claim 12, each of the hydraulic actuators further comprising:

a hydraulic cylinder;

a piston for reciprocal movement in the hydraulic cylinder and separating the hydraulic cylinder into a working cavity and an opposing cavity that expand and contract in volume responsive to the back and forth movement of the piston;

a plunger, connected to the piston, retracting into and extending from the hydraulic cylinder responsive to the reciprocal movement of the piston; and a resilient element biasing the plunger to extend from the hydraulic cylinder;

wherein the rolling interface is disposed at an end of the plunger extending from the hydraulic cylinder.

14. The brake system of claim 13, each of the hydraulic actuators further comprising a flow direction valve, operable between an actuator-engaged position and an actuator-retracted position, controlling fluid communication between the working cavity and the opposing cavity and between the working cavity and the brake control unit;

wherein the hydraulic actuator is free to engage the rotor when the flow direction valve is in the actuator-engaged position and the hydraulic actuator is retained from engagement when the rotor with the flow direction valve is in the actuator-retracted position.

15. The brake system of claim 14, wherein the flow direction valve is operated into the actuator-engaged position and the actuator-retracted position responsive to the brake control unit being operated into the brake-on position and the brake-off position respectively.

16. The brake system of claim 11, wherein each of the hydraulic actuators for engaging one of the cam surfaces engages a different portion of a profile of the cam surface.

17. The brake system of claim 11, wherein an equal number of the hydraulic actuators can engage each of a first and a second of the cam surfaces.

18. The brake system of claim 10, wherein the brake force control signal is selected from the group consisting of an electric signal, a hydraulic pressure signal and a pneumatic signal.

* * * * *